(12) United States Patent
Huslak et al.

(10) Patent No.: US 7,617,516 B2
(45) Date of Patent: Nov. 10, 2009

(54) METHODS AND SYSTEMS FOR PROVIDING VIDEO ON DEMAND OVER A COMMUNICATION NETWORK USING MANAGED QUALITY OF SERVICE, BANDWIDTH ALLOCATION AND/OR USER PROFILES

(75) Inventors: Nicholas Steven Huslak, Duluth, GA (US); Thomas Arnold Anschutz, Conyers, GA (US); Edgar Vaughan Shrum, Jr., Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 934 days.

(21) Appl. No.: 10/880,032

(22) Filed: Jun. 29, 2004

(65) Prior Publication Data

US 2004/0261094 A1 Dec. 23, 2004

Related U.S. Application Data

(63) Continuation-in-part of application No. 10/756,784, filed on Jan. 13, 2004.

(60) Provisional application No. 60/470,650, filed on May 15, 2003.

(51) Int. Cl.
*H04N 7/173* (2006.01)
(52) U.S. Cl. .............................. 725/95; 725/86; 725/87; 725/91; 725/96; 725/97; 725/98
(58) Field of Classification Search ................... 725/86, 725/87, 91, 95–98
See application file for complete search history.

(56) References Cited

U.S. PATENT DOCUMENTS

| | | | | |
|---|---|---|---|---|
| 6,385,203 | B2* | 5/2002 | McHale et al. | 370/401 |
| 6,470,378 | B1* | 10/2002 | Tracton et al. | 709/203 |
| 6,553,568 | B1* | 4/2003 | Fijolek et al. | 725/111 |
| 7,086,077 | B2* | 8/2006 | Giammaressi | 725/95 |

(Continued)

OTHER PUBLICATIONS

Blake et al., "An Architecture for Differentiated Services," *The Internet Society* (Dec. 1998).

(Continued)

*Primary Examiner*—Hunter B. Lonsberry
(74) *Attorney, Agent, or Firm*—Myers Bigel Sibley & Sajovec

(57) ABSTRACT

Methods for providing video on demand service from an Application Service Provider ("ASP") to a user over a Regional/Access Network ("RAN") are provided. A request for a video on demand application flow may be received from the user. In response to the request, information may be obtained from the RAN regarding the capabilities of the user's Customer Premises Equipment ("CPE"). A profile may then be forwarded from the ASP to the RAN that specifies at least one policy regarding the transmission of data associated with the video on demand application flow across the RAN. The data associated with the video on demand application flow may then be forwarded across the RAN in accordance with the profile. The RAN may also be provided a default profile that specifies default policies that apply with respect to video on demand application flows that are transmitted across the RAN prior to obtaining information from the RAN regarding the capabilities of the CPE of any specific user. The user specific profiles may then be used to alter one or more policies specified in the default profile.

39 Claims, 3 Drawing Sheets

U.S. PATENT DOCUMENTS

2003/0126610 A1* 7/2003 Ando .......................... 725/91
2004/0057456 A1* 3/2004 He et al. ..................... 370/465

OTHER PUBLICATIONS

DSL Forum, "DSL Evolution-Architecture Requirements for the Support of QoS-Enabled IP Services," Proposed Draft: PD-00X, Revision 1 (Aug. 2002).

DSL Forum, "DSL Evolution-Architecture Requirements for the Support of QoS-Enabled IP Services," Working Text: WT-081, Revision 4 (Dec. 2002).

DSL Forum, "DSL Evolution-Architecture Requirements for the Support of QoS-Enabled IP Services," Working Text: WT-081, Revision 5 (Feb. 2003).

DSL Forum, "DSL Evolution-Architecture Requirements for the Support of QoS-Enabled IP Services," Working Text: WT-081, Revision 6 (Mar. 2003).

DSL Forum, "DSL Evolution-Architecture Requirements for the Support of QoS-Enabled IP Services," Working Text: WT-081, Straw Ballot Revision (7) (Mar. 2003).

DSL Forum, "DSL Evolution-Architecture Requirements for the Support of QoS-Enabled IP Services," Working Text: WT-081, Straw Ballot Revision (8) (Mar. 2003).

DSL Forum, "DSL Evolution-Architecture Requirements for the Support of QoS-Enabled IP Services," Working Text: WT-081, Letter Ballot Revision (9) (Jun. 2003).

Anscshutz et al., DSL Forum, "DSL Evolution-Architecture Requirements for the Support of QoS-Enabled IP Services," Technical Report: TR-059 (Sep. 2003).

* cited by examiner

METHODS AND SYSTEMS FOR PROVIDING VIDEO ON DEMAND OVER A COMMUNICATION NETWORK USING MANAGED QUALITY OF SERVICE, BANDWIDTH ALLOCATION AND/OR USER PROFILES

RELATED APPLICATIONS

This application is a continuation in part of, and claims the benefit and priority of U.S. application Ser. No. 10/756,784, filed Jan. 13, 2004 which claims priority to U.S. Provisional Patent Application No. 60/470,650, filed May 15, 2003, the disclosures of which are incorporated herein by reference as if set forth in their entirety.

BACKGROUND OF THE INVENTION

The present invention relates to data architectures for communication networks, and, more particularly, to data architectures for managing Quality of Service (QoS) in communication networks.

The Internet is a decentralized network of computers that can communicate with one another via the internet protocol (IP). Although the Internet has its origins in a network created by the Advanced Research Project Agency (ARPA) in the 1960's, it has only recently become a worldwide communication medium. To a large extent, the explosive growth in use and traffic over the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher.

The WWW is a client-server based facility that includes a number of servers (computers connected to the Internet) on which Web pages or files reside, as well as clients (Web browsers), which interface the users with the Web pages. Specifically, Web browsers and software applications send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The topology of the WWW can be described as a network of networks, with providers of network service called Network Service Providers, or NSPs. Servers that Application Service Providers (ASPs). Sometimes a single service provider does both functions within a single business In recent years, broadband access technologies, such as digital subscriber line (DSL), cable modems, asynchronous transfer mode (ATM), and frame relay have facilitated the communication of voice, video, and data over the Internet and other public and private networks. Because broadband technologies are typically deployed by a single transport service provider, like a Regional Bell Operating Company (RBOC), their Regional and Access Networks (RAN) are often shared by many NSPs and ASPs offering services that range from Internet access and VPN access to Voice over IP, Video on Demand, and Gaming. Up until recently, a given Customer Premises Network (CPN) would have been connected to a single service provider in a generic way, however a new standard for RAN service (DSL Forum TR-059) provides a RAN architecture that allows simultaneous access to multiple NSPs and ASPs and for differentiating the data transport service provided by a RAN to these service providers.

Moreover, broadband access technology has allowed service providers to expand their content and service offerings to both business and home users. For example, a user may subscribe to multiple services or applications, such as voice service, Internet access service, a video service, a gaming service, etc. from one or more service providers. These services and/or applications may be delivered over a single network connection, such as a DSL line. Unfortunately, with multiple new connectivity options and applications that require specific characteristics from the network, there is also a need to establish priorities in bandwidth allocation among multiple services and/or applications so as to customize the content delivery according to the users' and/or providers' preferences.

SUMMARY OF THE INVENTION

Embodiments of the present invention are directed to methods for providing video on demand services in a Regional/Access network ("RAN") or other high speed data communication network that provides end-to-end transport between an Application Service Provider ("ASP") and an end user.

Pursuant to certain embodiments of the present invention, a request for video on demand content (i.e., a request for provision of a video on demand application flow) may be received from a user. A profile for the user may then be forwarded to the communication network, where the forwarded profile specifies at least one policy regarding transmission of the video on demand application flow over the communication network. The video on demand application flow may then be provided to the communication network for transmission to the user in accordance with the forwarded profile. In certain embodiments of the present invention, information may also be obtained from the communication network regarding one or more capabilities of the access, such as the Routing Gateway, the RAN, and/or the Customer Premises Network, that is associated with the user in response to the request for video on demand content. This may be done, for example, by forwarding a query to the communication network regarding the capabilities of the access and receiving a response thereto.

In these methods, the communication network may be a Regional/Access Network. The Regional/Access network may also be provided a generic VoD default profile that specifies default policies that apply with respect to video on demand application flows that are transmitted over the network. The generic VoD default profile may be provided before the above-mentioned profile for the user is forwarded to the Regional/Access network. The forwarded profile may, for example, alter at least one policy specified in the existing profile.

Before the profile for the user is forwarded, the user further may be provided options relating to the quality, buffering delay and/or pricing of the requested video on demand application flow. For example, the user might be provided the option of downloading the requested video on demand application flow at a high quality level after a relatively extended waiting time or at a lower quality level after a shorter waiting time. At least one of these options may be set based on the information obtained from the network regarding the capabilities of the access associated with the user.

Pursuant to further embodiments of the present invention, methods for a video on demand Application Service Provider ("ASP") to provide a video on demand service over a Regional/Access Network are provided in which a generic VoD default profile is forwarded to the Regional/Access Network that specifies default policies for the video on demand service. A request for a video on demand application flow may then be received from a user of the service. It may then be determined if the requested video on demand application flow can be supported under the policies of the generic VoD default profile. If so, the video on demand application flow may be provided to the Regional/Access Network for transmission to the user.

In such methods, information may be obtained from the Regional/Access Network regarding the capabilities of the access, such as a Routing Gateway, the RAN, and/or a Customer Premises Network associated with the user and, based at least in part on this information, a profile may be forwarded to the Regional/Access Network that changes one or more of the policies in the generic VoD default profile. The user may also be provided certain options relating to the quality of the transmitted video on demand application flow, where at least one of these options is set based on the information obtained from the Regional/Access Network regarding the capabilities of the access.

Pursuant to still other embodiments of the present invention, methods of providing video on demand using Quality of Service ("QoS") in a Regional/Access Network that provides end-to-end transport between an ASP and the access are provided. In these methods, a request for a video on demand application flow may be received from a user. Then, a desired QoS and/or a maximum downstream data rate for a video on demand session that will deliver the requested video on demand application flow may be requested from the Regional/Access Network. This may be done, for example, using a generic VoD default profile and/or a user specific profile. The video on demand application flow may then be activated using the desired QoS and/or maximum downstream data rate.

Pursuant to still further embodiments of the present invention, methods are provided for a Regional/Access Network to forward a video on demand application flow from an ASP to a user. Pursuant to these methods, at least one capability of one or more items of the access associated with the user is determined. Information regarding this capability is then provided to the ASP and, in response thereto, a profile for the user is received from the ASP that specifies at least one policy regarding transmission of the video on demand application flow over the Regional/Access Network. The video on demand application flow is then forwarded from the ASP to the user based on the received profile.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of embodiments of the present invention will be more readily understood from the following detailed description of specific embodiments thereof when read in conjunction with the accompanying drawings, in which.

DETAILED DESCRIPTION

Figure 1:
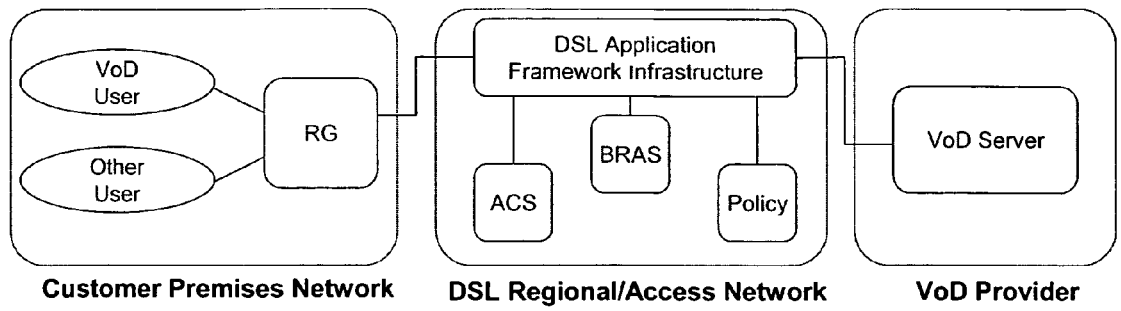
FIG. 1 is a block diagram that illustrates a video on demand service architecture using the application framework infrastructure in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described herein in the context of digital subscriber line (DSL) technology for purposes of illustration. It will be understood that the present invention is not limited to DSL technology. Indeed, other communication technologies and/or network configurations, such as, but not limited to, asynchronous transfer mode (ATM), frame relay, hybrid fiber coax (HFC), wireless broadband, and/or Ethernet may also be used in other embodiments of the present invention. In general, the present invention is not limited to any communication technology and/or network configuration, but is intended to encompass any technology and/or network configuration capable of carrying out operations described herein. Embodiments of the present invention are also described herein in the context of managing quality of service (QoS). As used herein, QoS includes, but is not limited to, treatment applied to an access session, application flow, and/or packet with respect to scheduling a resource, bandwidth allocation, and/or delivery target in an individual element or across an end-to-end system.

Applicants hereby incorporate by reference the disclosure of application Ser. No. 10/756,784, filed Jan. 13, 2004, from which the present application claims priority, in its entirety as if set forth fully herein. Application Ser. No. 10/756,784 provides a detailed disclosure of, among other things, DSL Application Frameworks according to certain embodiments of the present invention.

This section illustrates how the DSL Application Framework can support a video on demand ("VoD") service in accordance with certain embodiments of the present invention. The video on demand service may be implemented entirely at an ASP, as will be described for various embodiments below. However, it will be appreciated by those of skill in the art that aspects of the video on demand service may be implemented in other embodiments of the invention at locations other than the ASP such as, for example, in the Regional/Access network. FIG. 1 illustrates an architectural model for supporting a video on demand service within a DSL Application Framework where the video on demand service may be implemented at an ASP.

Video on demand ("VoD") refers to a service in which an end user is allowed to select and view one or more items of video content (e.g., movies) without having to leave their residence or use a mail-order service. The video on demand service may be set up so that the end user accesses the video content via a broadband pipe (such as a DSL internet connection or a cable modem) on a transactional and/or a fixed fee basis. Typically, the end user may view the selected content at the time of their choosing. The end user may view the content ordered via the video on demand service on a display device, such as a television set and/or a personal computer monitor. The end user may also have additional devices such as home networking systems, set top boxes, a personal video recorder and the like that may be used in delivering the video on demand content to the end user. Video on demand client software that is compatible with the ASP's video on demand service is typically provided to end users of the video on demand service. This software may be provided in a variety of ways, including downloads, purchase at retail outlets, mailing, etc.

Several different playback schemes are available for providing video on demand content to an end user. For instance, the video on demand ASP may provide the video content to the end user via "real time streaming" where the video content is provided to the end user at approximately the rate required to display the content on the end user's television set and/or computer monitor. Theoretically, with real time streaming the end user can feed the received video content directly to his or her display device without feeding it through any intermediate storage device as the video content is played as it is received. In some implementations, the video content is played to the user through a small buffer memory so as to allow, for example, for retransmission of frames that are corrupted by, for example, temporary impairments in the broadband pipe.

In a second implementation, the video on demand ASP may provide the requested video content to the end user in its entirety in advance of viewing. Such implementations generally require the end user to have storage capacity sufficient to store the entirety of the requested content. Such implementations also typically have a relatively large delay between the time the end user requests the video content and the time the end user can play it. However, if the entirety of the video content is downloaded in advance, the end user may have the capability to start viewing the content at the beginning, middle or end, and the end user may be provided numerous video cassette recorder-like playback features (e.g., Fast Forward, Reverse, Pause, Slow, etc.), which may be used when viewing the delivered video content.

In still other implementations, a "buffer and play" model may be used to implement the video on demand service. In such implementations, the user in the Customer Premises Network may begin to play (view) the movie or other delivered video content before the entire content file has been downloaded to a storage device resident at the end user such as, for example, a hard drive or a personal video recorder. Under the buffer and play model, viewing of the video content is typically delayed until after a sufficient amount of the content has been downloaded such that the remainder of the content can be downloaded in a time period that is less than the time required to view the entire movie. This time period will generally depend on, among other things, the maximum downstream data rate to the end user and any bandwidth allocation and/or precedence established with respect to delivery of the video content to the end user. Portions of the video content that are delivered while the end user is viewing the content are buffered and delivered to the display at the appropriate time. Typically, the downstream data rate for providing the video content to the end user exceeds the rate at which the delivered data is provided to the user during normal viewing. Consequently, under the buffer and play model, the end user may be able to begin playback within, for example, just a few seconds of the beginning of the download.

In certain embodiments of the present invention, the video on demand service may be implemented within a high speed access communication network (e.g., the DSL Application Framework or a cable modem network) using "generic VoD default profiles." In one such embodiment of the present invention, the video on demand service may be implemented within the DSL Application Framework by having the video on demand ASP provide a "generic VoD default profile" to the Regional/Access network. This profile specifies one or more settings or "policies" under which traffic between the video on demand ASP and an end user will be delivered such as, for example, maximum upstream and/or downstream data rates, precedences and/or bandwidth allocations that are to be applied with respect to video on demand traffic carried by the Regional/Access network ("RAN"). This profile is referred to herein as a "default" profile because, absent further instructions, it may be applied to all potential customers of the video on demand ASP that are within the Regional/Access network. The use of this generic VoD default profile can, in certain situations, reduce and/or minimize the interaction between the video on demand ASP and the Regional/Access network required to implement the video on demand service.

By way of example, the end user(s) served by the Regional/Access Network might each have one of several different types of access that support different maximum downstream data rates (e.g., 1.5 Mbps, 4 Mbps or 8 Mbps). In such a situation, the generic VoD default profile might specify a maximum downstream data rate setting of 1.5 Mbps, thereby ensuring that the Regional/Access network does not stream the video content to any end user at a downstream data rate that exceeds the maximum data rate supported by any end user's access. Alternatively, the generic VoD default profile might specify a maximum downstream data rate setting of 8 or 10 Mbps in an effort to always stream the video on demand content to the end user at the maximum rate that the end user's access can receive the content. The generic VoD default profile likewise may specify a default precedence that the Regional/Access network applies to packets associated with video on demand application flows. The parameters in the generic VoD default profile typically are selected such that video on demand application flows carried by the Regional/Access network (or other communication network) will provide effective delivery, using, for example, the "buffer and play" model of delivery discussed above, of the majority of video content that may be ordered by the video on demand end users. By having a generic VoD default profile in place, the communication network may not need to keep track of the capabilities of individual end users but, instead, can stream video on demand application flows to and from all end users according to the parameters in the generic VoD default profile. However, as discussed below, in at least certain embodiments of the present invention, the communication network may still gather and/or track information regarding, for example, the capabilities and network usage of specific end users that the communication network provides to the video on demand ASP.

While the above discussion was directed to embodiments in which a single generic VoD default profile was provided to the Regional/Access or other communication network, it will be understood in light of the teachings of the present disclosure that, in some situations, the video on demand ASP may provide multiple generic VoD default profiles to the Regional/Access or other communication network. Such an approach might be used, for example, in situations where the end users who access the video on demand ASP through the Regional/Access network have different types of access that support different maximum downstream and/or upstream data rates. In this case, a different default policy may be provided that is matched to each different type of access. In such embodiments, the end users could access the video on demand ASP via several different ASP associated IP addresses, with a different generic VoD default profile being associated with each of these IP addresses.

In still other embodiments of the present invention, the video on demand ASP may query a network provider such as, for example, a Regional/Access network provider, to determine the capabilities of the access of an end user who has requested video on demand service. In such embodiments of the present invention, the video on demand ASP may use the information obtained through the query regarding the capabilities of the end user's access to determine whether or not to instruct the network provider to deviate from any of the policies set forth in the applicable generic VoD default profile with respect to video on demand application flows between the ASP and this particular end user. By way of example, the video on demand service may be set up so that end users input requests for video content via a website that is operated and/or controlled by the video on demand ASP. When an end user accesses the ASP's website, the ASP may ascertain the identity of the end user from, for example, the user's Internet Protocol ("IP") address. The ASP can forward this IP address to the network (which, in this example, is a Regional/Access network) as part of a query that requests that the Regional/Access network provide the ASP information regarding certain capabilities of the access at the end user such as, for example, maximum supported upstream data rate, maximum supported downstream data rate, bandwidth allocations and/or QoS options that may be supported for service to the end user. The query may request additional information such as, for example, the amount of the upstream and downstream capacity of the end user's access that is currently dedicated to other applications, information regarding the end user's access (e.g., the type and/or capabilities of home networking equipment and/or televisions and computer monitors) and/or other information regarding the end user such as credit ratings, billing information, etc. The Regional/Access network may have previously stored this information and may simply provide it to the ASP. Alternatively, the Regional/Access network may gather at least some of the requested information via a query sent to the end user's Customer Premises Equipment ("CPE") such as a Routing Gateway ("RG") or modem. The Regional/Access network may then forward the requested information regarding the capabilities of the end user's access to the ASP.

In certain embodiments of the present invention, the ASP may use the information provided regarding the capabilities of the end user's access to provide options to the end user regarding the video on demand service that is delivered. This may be done in real time while, for example, the end user is logged onto the ASP's website ordering video on demand content. By way of example, the Regional/Access or other communication network may be operating under a generic VoD default profile in which the maximum downstream data rate for the video on demand application flow is set at 1.5 Mbps per end user. The results of the query, however, may reveal that the end user's access will support data rates of up to 8 Mbps, will support QoS and that no other applications are currently transmitting or receiving data over the end user's connection to the communication network. Based on this information, the ASP may offer the end user various options in the ordering process. For example, the ASP may indicate that the requested movie may be streamed for immediate viewing at a broadcast television viewing quality, may be streamed for viewing in 10 minutes at a DVD quality viewing resolution, or may be streamed in 20 minutes for a High Definition Television ("HDTV") quality viewing. The video on demand ASP might likewise vary the price of the video content based on the quality of the video stream provided and/or the amount of delay before the content can be viewed. The end user may then select the option that fits their needs via, for example, the webpage interface.

If the end user selects an option that cannot be supported under the generic VoD default profile (e.g., the end user requests an HDTV quality signal, which cannot be downloaded in 20 minutes under the maximum downstream rate provided for in the generic VoD default profile), the video on demand ASP may send the Regional/Access network (or other communication network) a user-specific profile that is used in place of the generic VoD default profile. For instance, in the example set forth above, the ASP may send a message to the Regional/Access Network instructing the Regional/Access Network that the video content may be forwarded to the end user at downstream data rates as high as 8 Mbps and further instructing the Regional/Access network to apply a higher precedence to data associated with the video on demand session to this specific end user. This revised policy is then implemented by the Regional/Access network. The Regional/Access network may also implement policies for controlling information streamed in the upstream direction, such as, for example, video on demand control information and video on demand acknowledgment streams. However, the system may also be configured to have, for example, the RG at least initially set the upstream policies to minimize the risk that the upstream policies are set at an internet access rate that is insufficient to support the video on demand service.

After the end user finishes viewing the requested video content, the Regional/Access or other communication network may or may not tear down the connection. In particular, according to some embodiments of the present invention, the Regional/Access or other communication network may keep track of end user usage of the video on demand service and leave all or part of the connection in place for frequent users of the service to avoid the need to reestablish the network connection (such as a point-to-point protocol or "PPP" session) when the end user orders movies in the future. For example, after an end user finishes viewing a movie, certain QoS parameters may be removed (e.g., provision of a maximum speed connection and/or a high precedence) so that those limited network capabilities may be assigned to other users, but the PPP session between the video on demand ASP and the end user will otherwise be left in place in anticipation that the end user will order additional movies in the near future. Similarly, in situations where the video on demand service provides the end user extended viewing rights (i.e., the end user may view the video content as many times as they want during, for example, a 1 or 3 day period), the network connection (i.e., the PPP session), including any special capabilities such as bandwidth allocations and/or elevated precedence, may be left in place until after the extended viewing period has expired. Leaving the PPP session in place in the manner just described may be advantageous, for example, in situations where the video content is provided via real time streaming.

A number of additional advanced capabilities may also be provided as part of the video on demand service. For instance, in some embodiments of the present invention, the video on demand ASP may perform "trickle downloading" of content that it determines is likely to be requested by an end user based, for example, on the end user's prior usage of the video on demand service. To implement this capability, the ASP may analyze the order histories of users of the video on demand service in an effort to identify patterns (e.g., orders most blockbuster "action" movie new releases; orders most Disney movies, etc.) in the user's viewing habits. Based on those patterns, the ASP may predict future orders by the user. In anticipation of such future orders, the ASP may download movies that it predicts the user will order in the future using a very low priority that only transfers packets when other traffic is not fully utilizing the capacity purchased by the ASP. The video content may then be stored, for example, on a storage device within the Customer Premise Equipment. As the bandwidth has already been purchased by the ASP and would otherwise remain unused, transferring data at the very low priority may impose relatively minimal cost on the ASP and may free up future capacity by downloading in advance movies that various users are likely to ultimately request.

A number of billing models are possible for the video on demand service. In some embodiments, the ASP may bill (flat monthly rate, flat rate per content ordered, rate based on movie length or download time, etc.) video on demand subscribers for their service. The Regional/Access or other communication network provider may bill the ASP for hosting the service and for the usage of the communication network. Once again, this may be billed at a flat monthly rate, a flat rate per item downloaded, a fixed or variable rate based on the amount of traffic carried, etc. Various other billing models may also be used.

Exemplary flows for setting up and tearing down video on demand sessions in accordance with some embodiments of the present invention will now be described.

Figure 2:
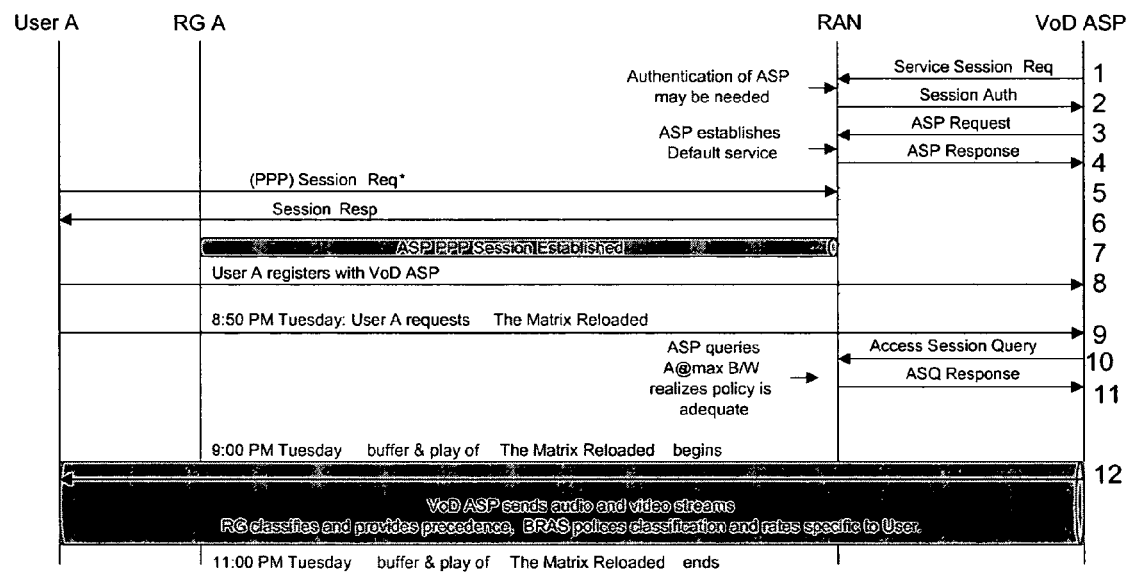
FIG. 2 is an event diagram that illustrates operations of the video on demand service architecture of FIG. 1 in accordance with some embodiments of the present invention.

FIG. 2 is a flow diagram illustrating provision of video on demand content to an end user by an ASP in accordance with some embodiments of the present invention. In FIG. 2, the video on demand application flow is provided across a Regional/Access Network, but, as discussed above, in other embodiments of the invention it may be done via other types of high speed networks such as, for example, a cable modem network. In the example of FIG. 2, User A is a user requesting video on demand content, in particular, "The Matrix Reloaded." For simplicity, the details of the Regional/Access network (DSL Service Manager, UNI and ANI protocol handlers, ACS, BRAS, etc.) are not shown as exemplary expanded flows have been shown in Section 6.4 of application Ser. No. 10/756,784, which is incorporated by reference herein. In the example of FIG. 2, the video on demand ASP has selected an unlimited usage ("all you can eat") business model that provides access to the Regional/Access network via, for example, a single Gigabit Ethernet interface in return for payment of a fixed monthly fee to the Regional/Access Network provider. The ASP is also allowed to use up to the maximum synch rate for each subscriber (end user) of the video on demand service, even if that synch rate exceeds the maximum rate at which the end user may access the Internet under the end user's agreement with its NSP.

As shown in row 1 of FIG. 2, the video on demand ASP ("VoD ASP") establishes communication with the Regional/Access network ("RAN") by sending a Service Session Request. The Regional/Access network responds to this request by authorizing the session (row 2). The Service Session Request process at rows 1 and 2 may include authentication of the ASP by the Regional/Access Network to ensure that unauthorized use of the Regional/Access Network does not occur.

The ASP may then send an ASP Request message to the Regional/Access network that includes a generic VoDdefault profile that may be used for all video on demand sessions that the Regional Access network services for the ASP (row 3). The Regional/Access network establishes the generic VoD default service profile and notifies the video on demand ASP once the generic VoD default profile is established (row 4). As noted above, in some of the embodiments of the present invention that include generic VoD default profiles, multiple generic VoD default profiles may be provided to the Regional/Access network so that different profiles may be set for different ASP addresses that support the video on demand service at different resolutions and/or frame rates. It will be appreciated that the generic VoD default profiles may be provided to the Regional Access network in a variety of other ways such as, for example, using a work order provided by the Regional/Access network instead of the ASP Request message discussed above.

The RG that services User A (RG A in FIG. 2) initiates a PPP Session Request (row 5). The Regional/Access network responds by providing RG A a session response that includes profile information that is relevant to the end users serviced by RG A (row 6). The Regional/Access network may be provided generic VoD default profiles or other similar information from a plurality of ASPs (i.e., not just an ASP that supports the video on demand service). The Regional/Access network may determine which of these profiles contain information that is applicable to RG A, resolve any conflicts that arise between profiles, and download the information to RG A. As shown in row 7 of FIG. 2, the ASP PPP session may then be used with the generic VoD default upstream (and downstream) policies in place. Note that the Regional/Access network may provide the generic VoD default profile information to RG A either before or after the ASP PPP session is established.

A potential user of the ASP's video on demand service, User A, registers for video on demand service, for example, on the video on demand ASP's website (row 8). As part of this registration process, User A may enter information, such as identification information, default viewing options, billing options, etc. User A may also request, obtain, configure and/or download a video on demand client application that may be loaded, for example, on User A's set top box, personal video recorder and/or personal computer.

After the registration is completed, User A may decide to request video content from the video on demand ASP. This request may be provided to the ASP in various different ways, such as, for example, logging onto the ASP's website and following instructions provided thereon for requesting video on demand content. In the example of FIG. 2, this request is shown at row 9 as a request for the movie "The Matrix Reloaded," which User A requests at 8:50 p.m. on Tuesday. Upon receiving the request, the ASP may check the availability of local resources necessary to provide the requested movie to User A such as, for example, server capacities, rights to stream the requested video content, available bandwidth under the ASP's agreement with the Regional/Access network, etc.

As discussed above, the video on demand ASP may offer User A various options such as, for example, resolution, quality, pricing and/or delay options, that define how and when the video on demand content is downloaded to User A. In many instances, it may be advantageous for the video on demand ASP to customize the options offered based on the capabilities of User A's CPE. Accordingly, as shown in FIG. 2, pursuant to some embodiments of the present invention, the video on demand ASP may query the Regional/Access Network for information regarding the capabilities of User A's CPE (row 10) and receive a response from the Regional/Access network containing some or all of the requested information (row 11). Based on this information, the ASP may make a determination as to whether the resources (i.e., the combination of the available local resources given the capabilities of User A) are adequate for delivery of the movie and/or provide User A with a variety of options regarding, for example, the quality, timing and/or pricing of the delivered video on demand content (note that the steps involved in providing User A with a variety of options is not pictured in FIG. 2).

By way of example, the ASP may use the information provided in response to the query of the Regional/Access network (e.g., the maximum downstream rate of User A's modem) to calculate the time required to download the requested video on demand content at different resolutions. The ASP may then give User A the option of selecting the resolution at which the movie is provided based on information provided by the ASP over the website or other interface that notifies User A of the buffering time associated with each possible option. Even if User A is not provided different viewing options, the ASP may still provide User A information regarding the expected buffering time, which the ASP may estimate based on the information provided by the Regional/Access network regarding the actual capabilities of User A's CPE.

In the example of FIG. 2, the ASP determines that the generic VoD default policy will be adequate to provide the requested video content to User A under the options selected by User A. If, instead, the generic VoD default policy is determined to be inadequate, the video on demand ASP may provide the Regional/Access network specific profile information for this particular video on demand session to User A that will be used in place of the generic VoD default profile information.

As shown at row 12 of FIG. 2, at 9:00 p.m. on Tuesday, the ASP begins sending the necessary audio/video streams to User A. The RG classifies information (i.e., determines which packets are associated with the video on demand application flow) and then applies the precedence to those packets that has been assigned for packets associated with this particular video on demand application flow (which, in the example of FIG. 2, is the precedence specified in the generic VoD default profile). The Regional/Access network tracks the classification and the upstream and downstream rates at which traffic associated with the video on demand application flow is carried. At 11:00 p.m. on Tuesday, User A completes viewing of the movie.

If, in the example of FIG. 2 the video on demand ASP was operating under a different business model, the Regional/Access network might, for example, process network usage information associated with the video on demand session (e.g., the number of kilobytes transported in the downstream and/or upstream directions on behalf of the ASP and User A) for eventual billing. If a user-specific profile was developed for User A, it may be left in place so that it may be used again in the event that User A orders additional movies in the future.

Operations for providing a video on demand service in accordance with certain embodiments of the present invention will now be described with reference to the flow chart illustration of FIGS. 3-5 from the perspective of the video on demand ASP.

Figure 3:
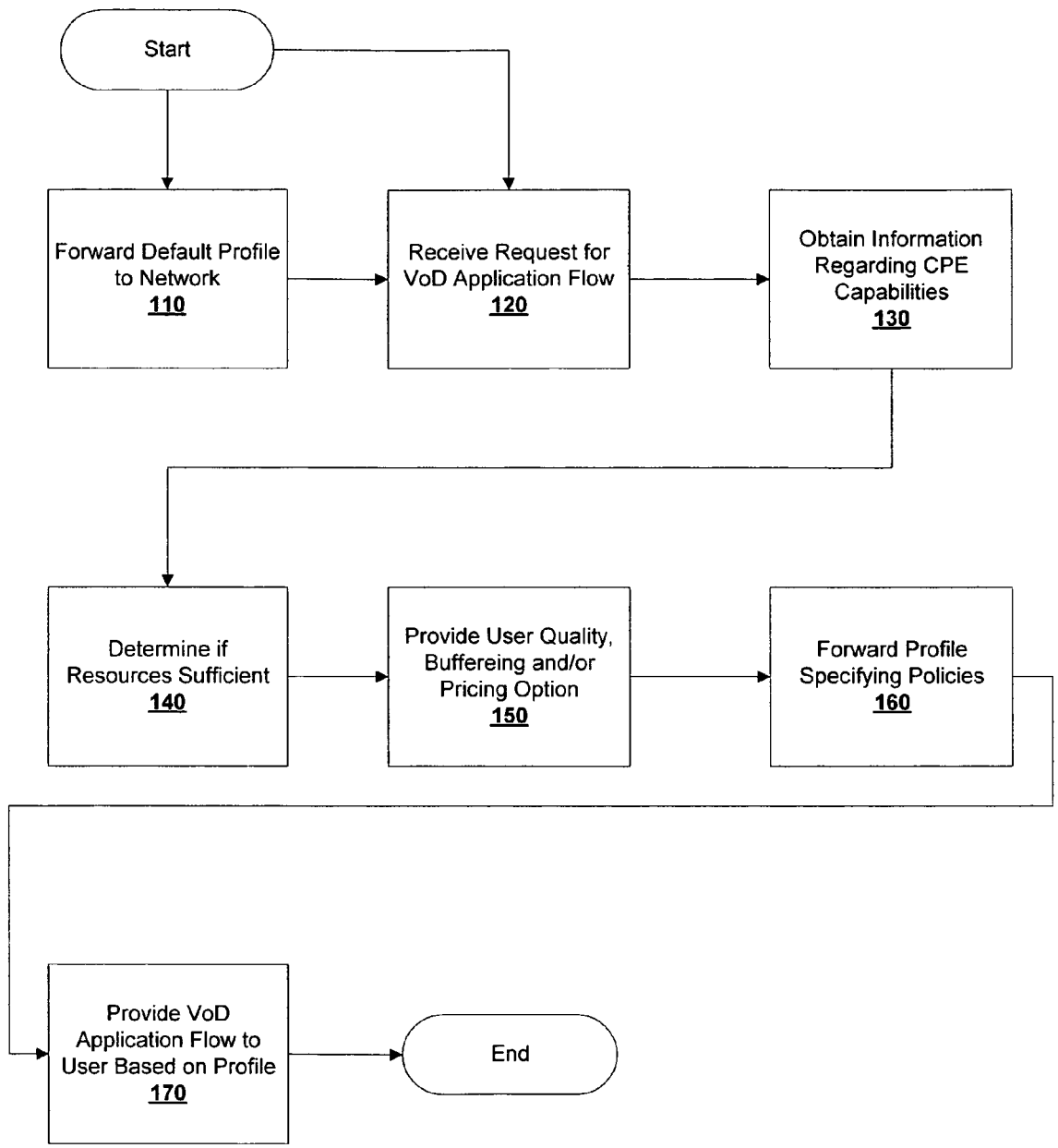
FIGS. 3-5 are flow charts illustrating operations for providing video on demand application flows from the perspective of an ASP in accordance with some embodiments of the present invention.

As shown in FIG. 3, in certain embodiments of the present invention, the ASP may provide the Regional/Access network a generic VoD default profile that specifies generic VoD default policies that are to be applied (absent instructions to the contrary) to all video on demand application flows that are transmitted across the Regional/Access network (block 110). These generic VoD default policies may be provided to the Regional/Access network via an ASP Request message as shown at row 3 of FIG. 2. The relevant generic VoD default policies may then be disseminated to RG A either before or after establishment of the PPP session that is set up at row 7 of FIG. 2. As is also shown in FIG. 3 (by the dual lines extending from the START block), in other embodiments of the present invention, the step of forwarding generic VoD default policies to the Regional/Access network and RG A may be omitted.

Regardless, of whether or not generic VoD default policies are disseminated, at some point the ASP receives a request for a video on demand application flow from an end user (block 120). Such a request is illustrated in FIG. 2 at row 9. In response to this request, the ASP may obtain information from the Regional/Access network regarding one or more of the capabilities of the end user's access (block 130). This step is illustrated at row 11 of FIG. 2 by the VoD ASP sending a query to the Regional/Access network ("RAN"). At this point, the ASP may make a determination as to whether or not sufficient local resources are available to fulfill the request (block 140).

As is also shown in FIG. 3 and discussed above, the ASP may provide the user with one or more options regarding, for example, the quality, buffering delay and/or pricing of the supplied video on demand session content (block 150). These options presented by the ASP may be based on the information obtained from the Regional/Access network regarding the capabilities of the Customer Premises Equipment that is discussed at block 130. By way of example, the user might be provided a choice between receiving the requested video content at a first, relatively low, quality level after a first, relatively short, waiting time or instead, of receiving the requested video content at a second, relatively high, quality level after a second, relatively long, waiting time.

The ASP may also forward a profile to the Regional/Access network that specifies at least one policy regarding the transmission of data associated with the video on demand application flow across the Regional/Access network (block 160). In embodiments of the present invention where a generic VoD default profile is used, this forwarded profile may, for example, modify one of the policies set forth in the generic VoD default profile. The step of forwarding a profile to the Regional/Access network is not illustrated in the application flow diagram of FIG. 2, but could be implemented, for example as an ASP Request message that flows from the VoD ASP to the Regional/Access network. The data associated with the video on demand application flow is then transmitted across the Regional/Access network in accordance with this profile (block 170). This data flow is illustrated in row 12 of FIG. 2.

Figure 4:
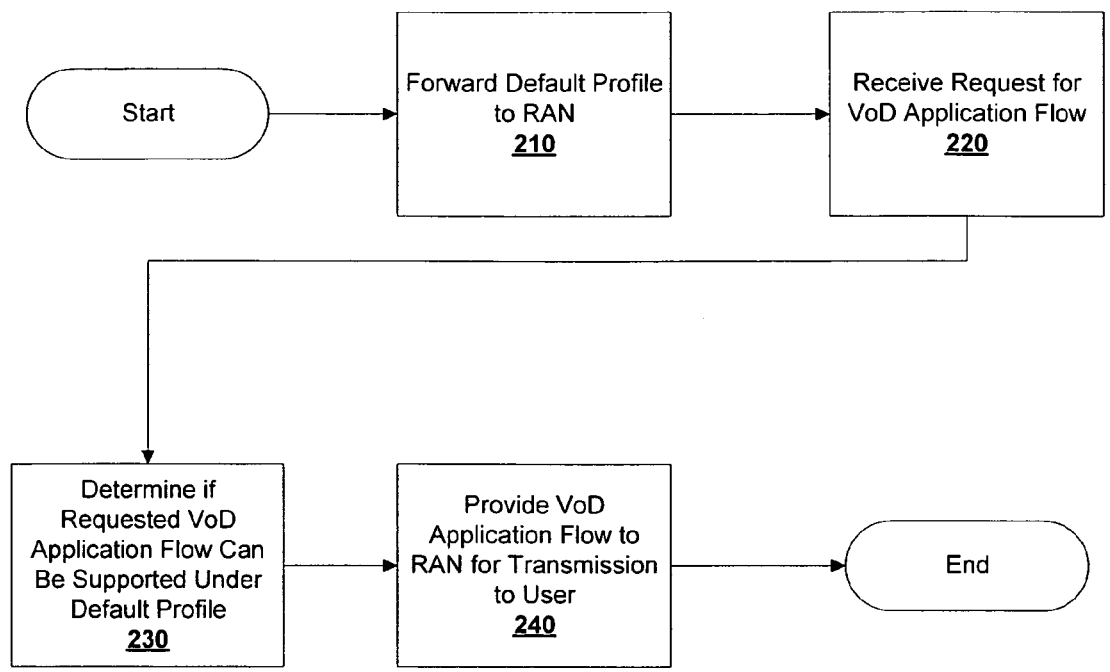

As shown in FIG. 4, pursuant to further embodiments of the present invention, methods for providing a video on demand service are provided in which the video on demand ASP forwards a generic VoD default profile to the Regional/Access network (block 210). The ASP thereafter may receive a request for a video on demand application flow (block 220). The ASP may then determine whether the video on demand application flow can be supported under the policies of the generic VoD default profile (block 230). If so, the ASP provides the video on demand application flow to the Regional/Access network for transmission to the requesting user (block 240).

Figure 5:
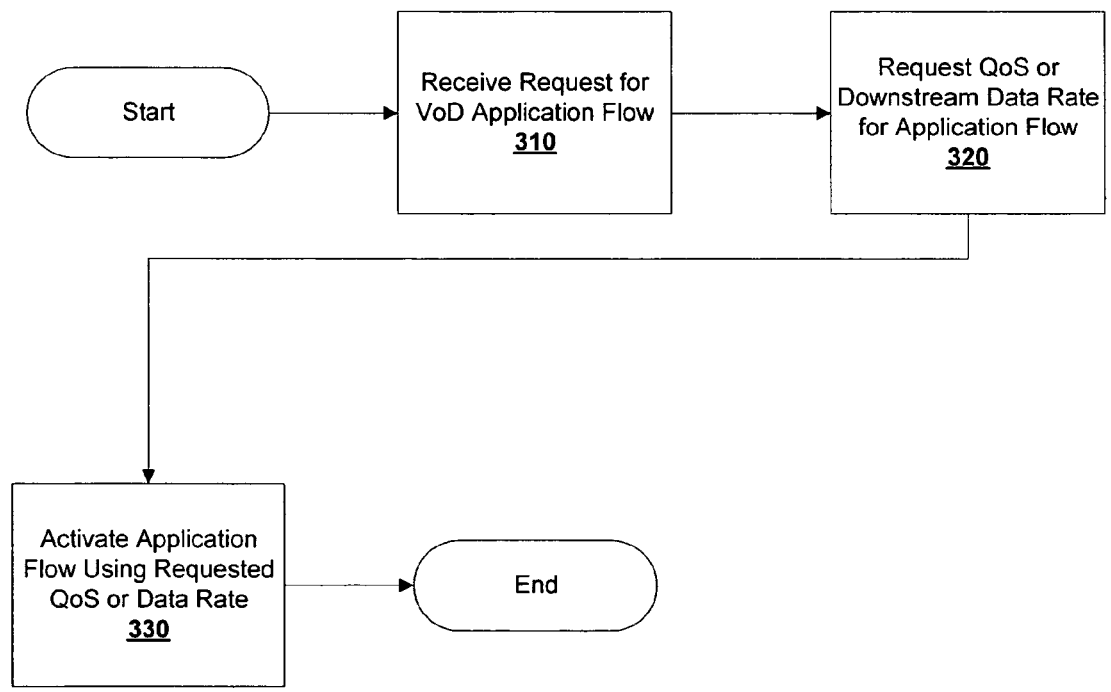

As shown in FIG. 5, in still other embodiments of the present invention, operations may start with, for example, the ASP receiving a request for a video on demand application flow (block 310). Responsive to this request, the ASP may request from the Regional/Access network a desired QoS and/or a maximum downstream data rate for the video on demand session that will deliver the requested video on demand application flow (block 320). The video on demand application flow may then be activated using the requested QoS and/or maximum downstream data rate (block 330).

The flowcharts of FIGS. 3-5 illustrate the architecture, functionality, and operation of possible implementations of systems, methods and computer program products for providing video on demand service over a Regional/Access or other communication network according to various embodiments of the present invention. In this regard, each block in the flow charts may represent a module, segment, or portion of code, which comprises one or more executable instructions for implementing the specified logical function(s). It should also be noted that, in some alternative implementations, the functions noted in the blocks may occur out of the order noted in FIGS. 3-5. For example, two blocks shown in succession may, in fact, be executed substantially concurrently, or the blocks may sometimes be executed in the reverse order, depending upon the functionality involved. It will also be understood that each block of FIGS. 3-5 and combinations of blocks in FIGS. 3-5 can be implemented by special purpose hardware-based systems which perform the specified functions or acts, or combinations of special purpose hardware and computer instructions.

Many variations and modifications can be made to the preferred embodiments without substantially departing from the principles of the present invention. All such variations and modifications are intended to be included herein within the scope of the present invention, as set forth in the following claims.

What is claimed is:

1. A method for an Application Service Provider ("ASP") to provide a video on demand service to a user over a communication network, the method comprising:
   receiving a request at the ASP for a video on demand application flow from the user;
   forwarding a profile for the user from the ASP to the communication network, wherein the forwarded profile specifies at least one policy regarding transmission of the video on demand application flow over the communication network; and
   providing the video on demand application flow from the ASP to the communication network for transmission to the user based on the forwarded profile;
   wherein the forwarding of the profile for the user from the ASP to the communication network is done in conjunction with obtaining at the ASP information from the communication network regarding at least one capability of the access associated with the user.

2. The method of claim 1, wherein the communication network comprises a Digital Subscriber Line ("DSL") Regional/Access Network ("RAN") that provides end-to-end transport between the ASP and the user.

3. The method of claim 2, wherein the forwarded profile specifies a desired QoS and/or bandwidth allocation for the requested video on demand application flow.

4. The method of claim 3, wherein the video on demand application flow is activated using the desired QoS and/or bandwidth allocation.

5. The method of claim 2, further comprising providing the RAN a generic VoD default profile specifying generic VoD default policies that apply with respect to video on demand application flows transmitted over the RAN prior to forwarding the profile for the user to the RAN.

6. The method of claim 5, wherein the forwarded profile alters at least one policy specified in the generic VoD default profile.

7. The method of claim 2, wherein forwarding the profile is preceded by providing the user with a plurality of options relating to the quality, buffering delay and/or pricing of the requested video on demand application flow.

8. The method of claim 7, wherein at least one of the plurality of options is set based on the information obtained from the RAN regarding the capabilities of the access associated with the user.

9. The method of claim 7, further comprising receiving from the user a selection of at least one of the plurality of options that are provided to the user.

10. The method of claim 9, further comprising basing at least some of the information in the forwarded profile on the received selection.

11. The method of claim 2, wherein obtaining information from the RAN regarding the capabilities of the access associated with the user comprises forwarding a query to the RAN regarding the capabilities of the access, and receiving a response to the query from the RAN containing at least some of the information requested by the query.

12. The method of claim 2, wherein the video on demand application flow that is provided to the RAN is provided in a manner that allows the RAN to transmit the video on demand application flow to the user at a data rate that exceeds a maximum data rate specified in a service agreement between the user and a Network Service Provider.

13. The method of claim 1, wherein the video on demand application flow that is provided to the communication network for transmission to the user is provided in a manner that allows the communication network to transmit the video on demand application flow to the user with a given QoS and/or up to the maximum data rate supported by the access associated with the user.

14. The method of claim 2, wherein the forwarded profile includes a bandwidth allocation and/or a precedence setting for the video on demand application flow in the downstream and/or upstream directions.

15. The method of claim 2, wherein receiving the request for the video on demand application flow from the user is preceded by authenticating the ASP with the RAN.

16. The method of claim 2, wherein a Broadband Remote Access Server ("BRAS") in the RAN controls transmission of the video on demand application flow across the RAN such that the video on demand application flow is transmitted in accordance with the forwarded profile.

17. The method of claim 5, further comprising receiving an acknowledgment message responsive to receipt of the generic VoD default profile.

18. The method of claim 2, wherein the access associated with the user comprises a Customer Premises Network ("CPN") associated with the user that includes a Routing Gateway ("RG") and further comprising transmitting the video on demand application flow to the CPN and wherein the following is performed by the RG:
  receiving packets associated with the video on demand application flow;
  classifying the received packets as associated with the video on demand application flow;
  marking packets associated with the video on demand application flow; and
  forwarding the received packets based on the forwarded profile for the video on demand application flow.

19. The method of claim 2, wherein the video on demand application flow is associated with a point-to-point protocol session.

20. A method for providing a video on demand service to a user from an Application Service Provider ("ASP") over a Regional/Access Network ("RAN") that provides end-to-end transport between the ASP and an access associated with a user, the method comprising:
  forwarding a generic VoD default profile to the RAN that specifies generic VoD default policies for the video on demand service;
  receiving a request for a video on demand application flow from the user;
  determining if the requested video on demand application flow can be supported under the policies of the generic VoD default profile; and
  providing the video on demand application flow to the RAN for transmission to the user.

21. The method of claim 20, further comprising obtaining information from the RAN regarding the capabilities of the access associated with the user and then forwarding a profile to the RAN that changes at least one of the policies in the generic VoD default profile.

22. The method of claim 21, further comprising providing the user with a plurality of options relating to the quality of the transmitted video on demand application flow.

23. The method of claim 22, wherein at least one of the plurality of options is set based on the information obtained from the RAN regarding the capabilities of the access associated with the user.

24. The method of claim 20, wherein the generic VoD default profile specifies a desired QoS and/or bandwidth allocation for a video on demand session that will deliver the requested video on demand application flow.

25. A method of providing video on demand using Quality of Service ("QoS") in a Regional/Access Network ("RAN") that provides end-to-end transport between an Application Service Provider ("ASP") and an access associated with a user, the method comprising:
  receiving a request for a video on demand application flow from the user;
  requesting from the RAN a desired QoS and/or a maximum downstream data rate for a video on demand session that will deliver the requested video on demand application flow; and
  activating the video on demand application flow using the desired QoS and/or maximum downstream data rate.

26. The method of claim 25, wherein the request for the desired QoS and/or maximum downstream data rate for the video on demand application flow is provided to the RAN via a generic VoD default profile.

27. The method of claim 25, wherein the request for the desired QoS and/or maximum downstream data rate for the video on demand application flow is provided to the RAN via a user specific profile forwarded from the ASP to the RAN.

28. The method of claim 25, wherein requesting the desired QoS and/or maximum downstream data rate is preceded by requesting identification of a capability associated with the access from the RAN and selecting the desired QoS and/or maximum downstream data rate based on the identified capability.

29. The method of claim 25, wherein requesting a desired QoS and/or maximum downstream data rate is preceded by authenticating the ASP with the RAN.

30. The method of claim 25, wherein requesting a desired QoS and/or maximum downstream data rate from the RAN is followed by receiving confirmation of the request from the RAN.

31. The method of claim 25, further comprising using a Broadband Remote Access Server (BRAS) in the RAN to allocate the desired QoS and/or maximum downstream data rate.

32. The method of claim 25, further comprising requesting a desired QoS and/or maximum upstream data rate.

33. The method of claim 27, wherein the access comprises a Customer Premises Network ("CPN") that includes a Routing Gateway ("RG"), and wherein the method further comprises:
  identifying the RG associated with the user;
  sending information from the user specific profile to the identified RG; and
  establishing the video on demand application flow to the user in accordance with the user specific profile.

34. The method of claim 33, further comprising the following performed at the identified RG and/or the RAN:
  receiving packets associated with the video on demand application flow;
  classifying the received packets as associated with the video on demand application flow; and
  forwarding the received packets based on the QoS and/or maximum downstream data rate for the video on demand session flow.

35. The method of claim 33, wherein the video on demand application flow is associated with a point-to-point protocol session.

36. The method of claim 33, wherein the RG comprises an xDSL modem.

37. A method for a Regional/Access Network ("RAN") to forward a video on demand application flow from an Application Service Provider ("ASP") to a user, the method comprising:
  determining at the RAN at least one capability of one or more items of an access associated with the user;
  providing information regarding the at least one capability of the one or more items of access associated with the user from the RAN to the ASP;
  receiving at the RAN a profile for the user forwarded from the ASP that specifies at least one policy regarding transmission of the video on demand application flow over the RAN responsive to providing information regarding the at least one capability of the one or more items of the access associated with the user to the ASP; and forwarding the video on demand application flow from the ASP to the user based on the received profile.

38. A system for use by an Application Service Provider ("ASP") to provide a video on demand service to a user over a communication network, the comprising:

means for receiving a request for a video on demand application flow from the user;

means for obtaining information from the communication network regarding the capabilities of an access associated with the user;

means for forwarding a profile for the user to the communication network in response to obtaining the information regarding the capabilities of the access associated with the user, wherein the forwarded profile specifies at least one policy regarding transmission of the video on demand application flow over the communication network; and means for providing the video on demand application flow to the communication network for transmission to the user based on the forwarded profile, wherein the forwarding of the profile for the user to the communication network is done in conjunction with obtaining information from the communication network regarding at least one capability of the access associated with the user.

39. A system for providing a video on demand service to a user from an Application Service Provider ("ASP") over a Regional/Access Network ("RAN"), comprising:

means for forwarding a generic VoD default profile to the RAN that specifies generic VoD default policies for the video on demand service;

means for receiving a request for a video on demand application flow from the user;

means for determining if the requested video on demand application flow can be supported under the policies of the generic VoD default profile; and means for providing the video on demand application flow to the RAN for transmission to the user.

\* \* \* \* \*

UNITED STATES PATENT AND TRADEMARK OFFICE
CERTIFICATE OF CORRECTION

| | |
|---|---|
| PATENT NO. | : 7,617,516 B2 |
| APPLICATION NO. | : 10/880032 |
| DATED | : November 10, 2009 |
| INVENTOR(S) | : Huslak et al. |

Page 1 of 1

It is certified that error appears in the above-identified patent and that said Letters Patent is hereby corrected as shown below:

In the Claims:

Column 16, Line 56, Claim 36: Please correct "modern" to read -- modem --

Signed and Sealed this

Second Day of February, 2010

David J. Kappos
*Director of the United States Patent and Trademark Office*